United States Patent
Delsol et al.

(10) Patent No.: US 9,544,910 B2
(45) Date of Patent: Jan. 10, 2017

(54) COMMUNICATIONS SYSTEM

(71) Applicant: NEC Corporation, Tokyo (JP)

(72) Inventors: Thomas Delsol, Berkshire (GB);
Yannick Lair, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/424,616

(22) PCT Filed: Mar. 19, 2014

(86) PCT No.: PCT/JP2014/001588
§ 371 (c)(1),
(2) Date: Feb. 27, 2015

(87) PCT Pub. No.: WO2014/156074
PCT Pub. Date: Oct. 2, 2014

(65) Prior Publication Data
US 2016/0021672 A1 Jan. 21, 2016

(30) Foreign Application Priority Data
Mar. 28, 2013 (GB) .................................. 1305821.9

(51) Int. Cl.
*H04W 72/00* (2009.01)
*H04W 72/08* (2009.01)
(Continued)

(52) U.S. Cl.
CPC ............ *H04W 72/085* (2013.01); *H04L 1/243* (2013.01); *H04L 43/50* (2013.01); *H04W 24/06* (2013.01);
(Continued)

(58) Field of Classification Search
CPC ....... H04L 43/50; H04L 1/0026; H04W 72/04; H04W 24/00
(Continued)

(56) References Cited

U.S. PATENT DOCUMENTS 8,279,764 B2 * 10/2012 Cooper ............... H04L 12/2697
370/227
9,232,420 B1 * 1/2016 Akiti ..................... H04W 24/06
(Continued)

FOREIGN PATENT DOCUMENTS

EP 2117267 A1 11/2009
EP 2330843 A1 6/2011
(Continued)

OTHER PUBLICATIONS

International Search Report corresponding to PCT/JP2014/001588, mail date Jun. 10, 2014, 2 pages.
(Continued)

*Primary Examiner* — Danh Le
(74) *Attorney, Agent, or Firm* — Wilmer Cutler Pickering Hale and Dorr LLP

(57) ABSTRACT

A communications system is described in which a test device monitors operation of a communication device. The test device identifies each communication bearer associated with the communication device; determines a subset comprising at least one communication bearer to be used when performing the test and not comprising at least one other communication bearer; and initiates the test in which each communication bearer in the subset is used and each communication bearer not in said subset is not used.

16 Claims, 8 Drawing Sheets

(51) Int. Cl.
| | |
|---|---|
| H04W 24/06 | (2009.01) |
| H04L 1/24 | (2006.01) |
| H04L 12/26 | (2006.01) |
| H04W 24/08 | (2009.01) |
| H04W 72/04 | (2009.01) |
| H04W 76/04 | (2009.01) |
| H04W 88/02 | (2009.01) |

(52) U.S. Cl.
CPC ........... *H04W 24/08* (2013.01); *H04W 72/042* (2013.01); *H04W 76/046* (2013.01); *H04W 88/02* (2013.01)

(58) Field of Classification Search
USPC ....................... 455/450, 67.11, 423; 370/241
See application file for complete search history.

(56) References Cited

U.S. PATENT DOCUMENTS

| | | | |
|---|---|---|---|
| 2003/0231741 A1 | 12/2003 | Rancu et al. | |
| 2004/0199370 A1 | 10/2004 | Arama et al. | |
| 2009/0257353 A1* | 10/2009 | Song | H04W 24/02 370/241 |
| 2010/0062722 A1* | 3/2010 | Dykema | H04B 17/327 455/67.11 |
| 2011/0096672 A1 | 4/2011 | Mattisson et al. | |
| 2013/0196600 A1* | 8/2013 | Capers | H04W 24/06 455/41.2 |
| 2014/0078916 A1* | 3/2014 | Kjeldaas | H04L 65/1083 370/252 |
| 2014/0269342 A1* | 9/2014 | Baron | H04L 43/50 370/242 |

FOREIGN PATENT DOCUMENTS

| | | |
|---|---|---|
| GB | 2486929 A | 7/2012 |
| JP | 2005-286841 A | 10/2005 |
| JP | 2011-523260 | 8/2011 |
| WO | WO-2009-135866 A1 | 11/2009 |

OTHER PUBLICATIONS

Letter from IPO office to NEC Corporation enclosing Great Britain International Search Report, mail date Oct. 1, 2013, 5 pages.

3GPP TR 22.803 V12.1.0 (Mar. 2013), 3rd Generation Partnership Project; Technical Specification Group Services and System Aspects; Feasibility study for Proximity Services (ProSe) (Release 12), (45 pages).

3GPP TS 23.401 V11.5.0 (Mar. 2013), 3rd Generation Partnership Project; Technical Specification Group Services and System Aspects; General Packet Radio Service (GPRS) enhancements for Evolved Universal Terrestrial Radio Access Network (E-UTRAN) access (Release 11) (285 pages).

3GPP TS 24.301 V12.0.0 (Mar. 2013), 3rd Generation Partnership Project; Technical Specification Group Core Network and Terminals; Non-Access-Stratum (NAS) protocol for Evolved Packet System (EPS); Stage 3 (Release 12) (345 pages).

3GPP TS 34.109 v11.1.0 (Mar. 2013), 3rd Generation Partnership Project; Technical Specification Group Radio Access Network; Terminal logical test interface; Special conformance testing functions (Release 11), (42 pages).

3GPP TS 36.300 v11.5.0 (Mar. 2013), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (209 pages).

3GPP TS 36.509 v10.0.0 (Sep. 2012), 3rd Generation Partnership Project; Technical Specification Group Radio Access Network; Evolved Universal Terrestrial Radio Access (E-UTRA) and Evolved Packet Core (EPC); Special conformance testing functions for User Equipment (UE) (Release 10), (41 pages).

* cited by examiner

COMMUNICATIONS SYSTEM

CROSS-REFERENCE TO RELATED APPLICATIONS

This application is a national stage application of International Application No. PCT/JP2014/001588 entitled "COMMUNICATIONS SYSTEM," filed on Mar. 19, 2014, which claims the benefit of the priority of British Patent Application GB 1305821.9, filed on Mar. 28, 2013, the disclosures of each of which are hereby incorporated by reference in their entirety.

TECHNICAL FIELD

The present invention relates to a communications system and to parts and methods thereof. The invention has particular but not exclusive relevance to wireless communications systems and devices thereof operating according to the 3GPP standards or equivalents or derivatives thereof.

BACKGROUND ART

Wireless communications systems enable users of User Equipment (UE) to communicate with other such users via one of a number of base stations and a core network. Typically, the UEs are mobile terminals, such as cellular telephones and the like. In an active or connected state a UE is registered with the network and has a Radio Resource Control (RRC) connection with a base station so that the network knows to which base station (or cell thereof) the UE belongs and can transmit data to and receive data from the UE. The base station (i.e. the serving cell) provides mobility information and security parameters for the user equipment. The UE also establishes a default Evolved Packet System (EPS) Bearer at an endpoint beyond the base station, typically a gateway, in the Enhanced Packet Core (EPC) network, or core network for short. An EPS Bearer defines a transmission path through the network and assigns an IP address to the UE, at which it can be reached by other communication devices, such as another UE. An EPS Bearer also has a set of data transmission characteristics, such as quality of service, data rate and flow control parameters, which are defined by the subscription associated with the UE and are established by the Mobility Management Entity (MME) upon registration of the UE with the network.

The EPS Bearer is thus managed by the MME, which signals to the UE when it needs to activate, modify, or deactivate a particular EPS Bearer. Thus there are always two connections between the UE and the communication network: one for the user data transmitted using the established EPS bearer (also known as the user plane) and another one for managing the EPS Bearer itself (also known as the control plane).

As part of the Long Term Evolution (LTE) of UTRAN (UMTS Terrestrial Radio Access Network) referred to as E-UTRAN, there are plans to introduce a feature of proximity based (e.g. direct device-to-device (D2D) or locally routed) communication when the UE can communicate user data to another UE that is within the transmission range of (or served by the same base station as that of) the first UE without the need to use LTE core network resources. Such services can be achieved by establishing a special, relaying EPS bearer to be used by the mobile communication devices in direct or locally routed communication instead of their default or other conventional EPS bearers (which might still be used for other types of communications). This direct or locally routed communication would result in better utilization of the available resources, especially on the radio interface, where these are limited. A so-called Proximity-based Services (ProSe) functionality has been specified in the 3GPP TR 22.803 (v 12.1.0) standards document, the contents of which are incorporated herein by reference.

More recently the provision of a relay functionality, in the UE, using the ProSe functionality has been proposed to allow one UE to relay the signalling for another UE to and from the network.

Due to the added complexity represented by the above functionalities and the like, it is important to ensure that each network element operates in conformance with the applicable set of standards (in this case the 3GPP standards). Since proximity based services significantly increase the complexity of the mobile communication devices (and other user equipment), there is a strong desire to test implementation of these (and similar) functionalities by the mobile communication devices before they are released to the market (or whilst they are in use in a communications network). However, the testing of such UE specific functions needs to be supported by the mobile communication device as well.

As known to a person skilled in the art, a so-called System Simulator (SS) entity may be used for testing compliance (and/or performance) of a network element, such as a base station or user equipment. The SS entity does this by simulating the operation of another network element (i.e. that would otherwise communicate with the device to be tested in a 'live' network). In addition to this, the SS entity controls the overall test process, including the operating parameters of a mobile communication device (in case the mobile communication device is being tested), such as activating/deactivating features, and setting an operating mode (e.g. normal mode, test mode, etc.).

The SS entity activates the test mode for the mobile communication device in which the SS entity is able to set up (remotely) one or more communication paths terminating in a so-called loopback function of the mobile communication device (from where the data units originating from the SS entity are forwarded or 'looped-back' to the SS entity). This effectively means that the SS entity is able to monitor communications by the mobile communication device taking place via the looped back communication path(s). Then, by monitoring and analyzing the communication taking place using the communication path(s) terminating in the loopback function, it is possible to determine whether or not the behaviour of the device being tested is in line with what is prescribed in the relevant set of standards (in which case conformance to that set of standards can be certified and/or the product can be released to the market). However, if the behaviour of the device being tested is not in line with the relevant set of standards, it is possible to determine suitable actions (e.g. re-design/re-configuration/ re-calibration of that device) so that conformance to the relevant set of standards can be achieved before using the device in a 'live' communication system.

The relevant mechanisms developed by 3GPP for special conformance testing functions are defined in TS 36.509 (for user equipment in E-UTRA frequency division duplex (FDD) mode and time division duplex (TDD) mode) and in TS 34.109 (for user equipment in UMTS system, for FDD and TDD modes). The contents of both documents are incorporated herein by reference.

In summary, the above specifications describe the functions and their activation/deactivation methods that each LTE/UMTS mobile communication device is required to implement for conformance testing purposes.

The UE test loop function provides access to isolated functions of the mobile communication device via the radio interface without requiring the presence and/or usage of a physical connection (e.g. a hardware interface) between the mobile communication device and the SS entity for conformance testing. However, it will be appreciated that the mobile communication device may also be connected to the SS entity using wired communication means (e.g. a Radio Frequency (RF) cable), for example, to avoid/reduce interference during test and hence increase test reliability.

For E-UTRA, the following loop modes have been defined:
UE test loop mode A
UE test loop mode B
UE test loop mode C UE test loop mode A provides loopback of data packets (e.g. Packet Data Convergence Protocol (PDCP) Service Data Units (SDUs)) for bi-directional data radio bearers while the UE is operating in E-UTRA mode. The downlink PDCP SDUs received by the UE on each bi-directional data radio bearer are returned on the same radio bearer regardless of the PDCP SDU contents and the Traffic Flow Template (TFT) of the associated EPS bearer context.

UE test loop mode B provides loopback of PDCP SDUs (E-UTRA and UTRA), Sub Network Dependent Convergence Protocol (SNDCP) Protocol Data Units (PDUs) (in GSM/GPRS) and Radio Link Protocol (RLP) PDUs (CDMA2000) for bi-directional EPS bearers while the UE is operated in E-UTRA, UTRA, GSM/GPRS or CDMA2000 modes. UE test loop mode B can not be used when more than one PDN connection is established or more than one primary Packet Data Protocol (PDP) context is active. When operating in E-UTRA, UTRA or GSM/GPRS then the downlink PDCP SDUs or SNDCP PDUs received by the UE on all bi-directional data radio bearers are returned by the UE on the data radio bearer associated with an EPS bearer context with a TFT matching the Transmission Control Protocol (TCP)/User Datagram Protocol (UDP)/Internet Protocol (IP) information within the PDCP SDU or SNDCP SDU. When operating in CDMA2000 modes, the downlink RLP PDUs received by the UE on all bi-directional data radio bearers are returned by the UE on the data radio bearer with the smallest identity, regardless of the RLP PDU content and the TFT of the associated EPS bearer context.

UE test loop mode C provides counting of successfully received Multimedia Broadcast and Multicast (MBMS) Packets on a given MBMS traffic channel (MTCH) while the UE is operating in Evolved MBMS (E-MBMS)/E-UTRA mode.

CITATION LIST

Non Patent Literature

NPL 1: 3GPP TR 22.803 (v 12.1.0) standards document
NPL 2: 3GPP TS 36.509 technical specification
NPL 3: 3GPP TS 34.109 technical specification

SUMMARY OF INVENTION

Technical Problem

However, each of these loop-modes is limited to certain test scenarios, and is relatively inflexible. For example, these loop-modes do not allow provision of a certain functionality (e.g. a relay function of a UE relay (UE-R)) to continue, unaffected, while the loopback function is being employed. Further, when a relaying functionality is implemented, it is not currently possible to test the conformance of this relay functionality to the above standards because of the limitations of the current test modes.

Loop mode A, for example, only allows to loopback a Radio bearer, not an EPS bearer (i.e. at PDCP level). For this loopback mode, the SS will indicate to the UE which Radio Bearer will need to be associated with a loopback function. Loop mode B only works when 1 PDN connection is activated. This is a known restriction from the specification. This loopback mode doesn't allow differentiating the different EPS bearers and all activated bearers will terminate in a single loop back entity which will send the PDCP SDU to the UL TFT SAP (Service Access Point) for transmission in an uplink. Loop mode C is restricted to MBMS.

Solution to Problem

In one aspect, the invention provides a communication device for communicating with a communication network test device operable to monitor operation of said communication device, the communication device comprising: means for operating a plurality of communication bearers associated with said communication device; means for determining a subset comprising at least one communication bearer, selected from said plurality of communication bearers, to be used when performing a test and not comprising at least one other communication bearer of said plurality of communication bearers; and means for communicating with the communication network test device in pursuance of a test in which each communication bearer in said subset is used and each communication bearer not in said subset is not used.

The communication device may further comprise means for receiving a message, from said communication network test device, the message comprising data identifying each communication bearer in said subset, wherein said determining means is operable to determine said subset based on said data identifying each communication bearer in said subset.

In another aspect, the invention provides a communication network test device for monitoring operation of a communication device, the test device comprising: means for communicating with said communication device; means for identifying each of a plurality of communication bearers associated with said communication device; means for determining a subset comprising at least one communication bearer, selected from said plurality of communication bearers, to be used when performing a test and not comprising at least one other communication bearer of said plurality of communication bearers; and means for initiating a test in which each communication bearer in said subset is used and each communication bearer not in said subset is not used.

The communication network test device may send a message, to said communication device, the message comprising data identifying each communication bearer in said subset. Alternatively, the communication network test device may send a message, to said communication device, the message comprising data identifying each communication bearer not in said subset. In this case, the communication device may determine said subset based on said data identifying each communication bearer not in said subset.

The message may comprise a bit pattern with at least one respective bit associated with each communication bearer of said plurality of communication bearers associated with said communication device. In this case, each said bit may be set to a predetermine value if said communication bearer is in said subset.

Alternatively, the message may comprise a bit pattern with at least one respective bit associated with a default communication bearer of said plurality of communication bearers associated with said communication device. In this case, each said bit may be set to a predetermine value if said default communication bearer and any associated communication bearer is in said subset.

The message may comprise a bearer identifier, e.g. an Evolved Packet System (EPS) Bearer ID (or EBI) for each communication bearer of said subset. The message may comprise a Non-Access Stratum (NAS) message. In this case, the NAS message may be embedded in at least one Radio Resource Control (RRC) message. The at least one message may comprise a downlink information transfer message.

The test initiated by said initiating means may be a loop-back test. The communication network test device may send test packets to said communication device using said at least one communication bearer of said subset. The communication network test device may receive, as part of said test, test packets from said communication device.

The plurality of communication bearers may comprise at least one EPS communication bearer.

The determining means may select communication bearers for said subset to be communication bearers that are not associated with at least one specific functionality of said communication device (e.g. a relay functionality or non-relay functionality). Alternatively, the determining means may select communication bearers for said subset to be communication bearers that are associated with at least one specific functionality of said communication device (e.g. a relay functionality or non-relay functionality). The determining may determine, when said test has been initiated, at least one communication bearer of said subset for which said test is to be terminated.

The communication network test device may initiate termination of said at least one communication bearer of said subset for which said test is to be terminated. The communication network test device may send a message to terminate said test to said communication device, the message to terminate said test comprising data identifying each communication bearer for which said test is to be terminated.

The message to terminate said test may comprise a bit pattern with at least one respective bit associated with each communication bearer of said plurality of communication bearers associated with said communication device. In this case, each said bit may be set to a predetermined value if said test is to be terminated for said communication bearer. The message may comprise a bearer identifier (e.g. an EPS Bearer ID or EBI) for each communication bearer of said subset for which said test is to be terminated. Alternatively, the message may comprise a NAS message. In this case, the NAS message may be embedded in at least one RRC message. The at least one message may comprise a downlink information transfer message.

In yet another aspect, the invention provides a communication device for communicating with a communication network test device operable to monitor operation of said communication device, the communication device comprising a processor operable to: operate a plurality of communication bearers associated with said communication device; determine a subset comprising at least one communication bearer, selected from said plurality of communication bearers, to be used when performing a test and not comprising at least one other communication bearer of said plurality of communication bearers; and communicate with the communication network test device in pursuance of a test in which each communication bearer in said subset is used and each communication bearer not in said subset is not used.

In a further aspect, the invention provides a communication network test device for monitoring operation of a communication device, the test device comprising a processor operable to: communicate with said communication device; identify each of a plurality of communication bearers associated with said communication device; determine a subset comprising at least one communication bearer, selected from said plurality of communication bearers, to be used when performing a test and not comprising at least one other communication bearer of said plurality of communication bearers; and initiate a test in which each communication bearer in said subset is used and each communication bearer not in said subset is not used.

The invention also provides a communication system comprising the above communication device and the above communication network test device. The invention also provides, for all test system entities and user devices disclosed, corresponding methods and computer programs or non-transitory computer-readable medium for execution on corresponding user equipment or network communications devices.

Advantageous Effects of Invention

According to the present invention, it can be achieved to provide methods and an apparatus which overcome or at least partially alleviate the above issues.

BRIEF DESCRIPTION OF DRAWINGS

Embodiments of the invention will now be described, by way of example, with reference to the accompanying drawings, in which.

DESCRIPTION OF EMBODIMENTS (Overview)

Figure 1:
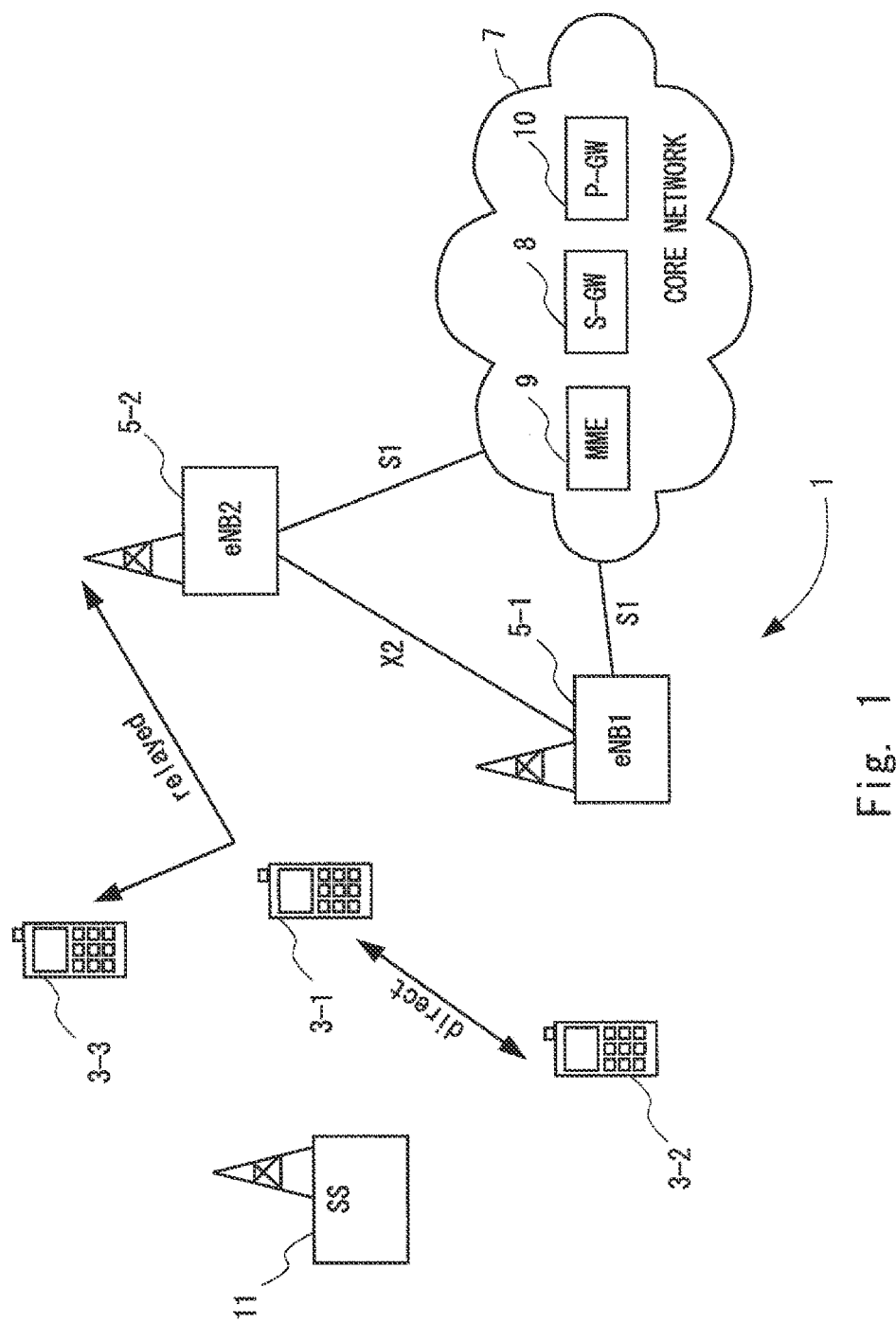
FIG. 1 illustrates schematically a cellular telecommunications system to which embodiments of the invention may be applied.

FIG. 1 schematically illustrates a communication system (communications network) 1 in which users of mobile communication devices (in this example mobile telephones 'MTs') 3-1 to 3-3 can communicate with each other and other users via E-UTRAN base stations 5-1 and 5-2 and core network 7. As those skilled in the art will appreciate, three mobile communication devices 3 and two base stations are illustrated in FIG. 1 for illustration purposes and others will be provided in a deployed system. Conventionally, when the mobile communication devices 3-1 and 3-2 are in communication with each other, user plane data is routed from the user equipment (mobile communication device) 3-1 to the base station 5-1, through the core network 7, back to the base station 5-1 and to the mobile communication device 3-2 (and similarly for user plane data sent in the opposite direction). Similarly, when the mobile communication devices 3-1 and 3-3 are in communication with each other, user plane data is conventionally routed from the user equipment (mobile communication device) 3-1 to the base station 5-1, through the core network 7, to the base station 5-2 and to the mobile communication device 3-3 (and similarly for user plane data sent in the opposite direction).

The communication paths described above ensure that data is transmitted between the mobile communication devices 3 in compliance with the relevant subscription parameters and also respecting the service criteria required by the mobile communication devices 3 and the security criteria imposed by the network. However, such a conventional arrangement is wasteful of resources in the base stations 5 and in the core network 7, as the two mobile communication devices 3 are within radio communications range of each other and thus a direct user plane communication link can be used instead, for example, as indicated in FIG. 1 by a line with an arrow at each end between the mobile communication devices 3-1 and 3-2. Moreover, the mobile communication device 3-1 is provided with a relaying functionality to allow user data to be relayed from the mobile communication device 3-3 to the network, as indicated by respective lines each with an arrow at one end between the mobile communication devices 3-1 and 3-3 and the serving base station 5-2.

Therefore, in this embodiment, the communication system (communications network) 1 also supports device-to-device, locally routed, and relayed user plane communication between compatible mobile communication devices 3.

FIG. 1 also shows a so-called system simulator (SS) entity 11, which normally does not form part of a deployed communication system. Instead, the SS entity 11 is used for testing purposes, for example, to test compatibility of various network elements with the other network elements and also to verify compliance of these network elements with the applicable standards.

In this embodiment, the SS entity 11 is used for verifying compliance of a mobile communication device 3 with the applicable standards using proximity based services. The SS entity 11 does this by activating a loopback functionality for the mobile communication device 3, which is used to loop back (i.e. re-route back to the SS entity 11) selected communication bearers (e.g. communication bearers not required for providing a relay service) whilst maintaining the normal routing of other communication bearers (e.g. which are required for the relay service) or applying loop back over the bearers separately, which is advantageous.

This 'selective' loopback functionality of the SS entity 11 is achieved by providing an identification of the EPS bearer to be associated with the loopback function, which has the benefit of leaving all other communication bearers unaffected. This ensures that any EPS bearer that is not part of the test procedure can be maintained with its normal functionality whilst the selected (identified) EPS bearer is being tested. This has the advantage of allowing testing of various EPS bearer configurations in a mobile communication device 3 for compliance with proximity based services, for example, the relaying functionality of mobile communication device 3-1.

This approach also allows verification of whether or not functionalities related to multiple on-going services are correctly implemented by the communications apparatus being tested (e.g. user equipment and/or a network element).

(EPS Bearer Architecture)

Figure 2:
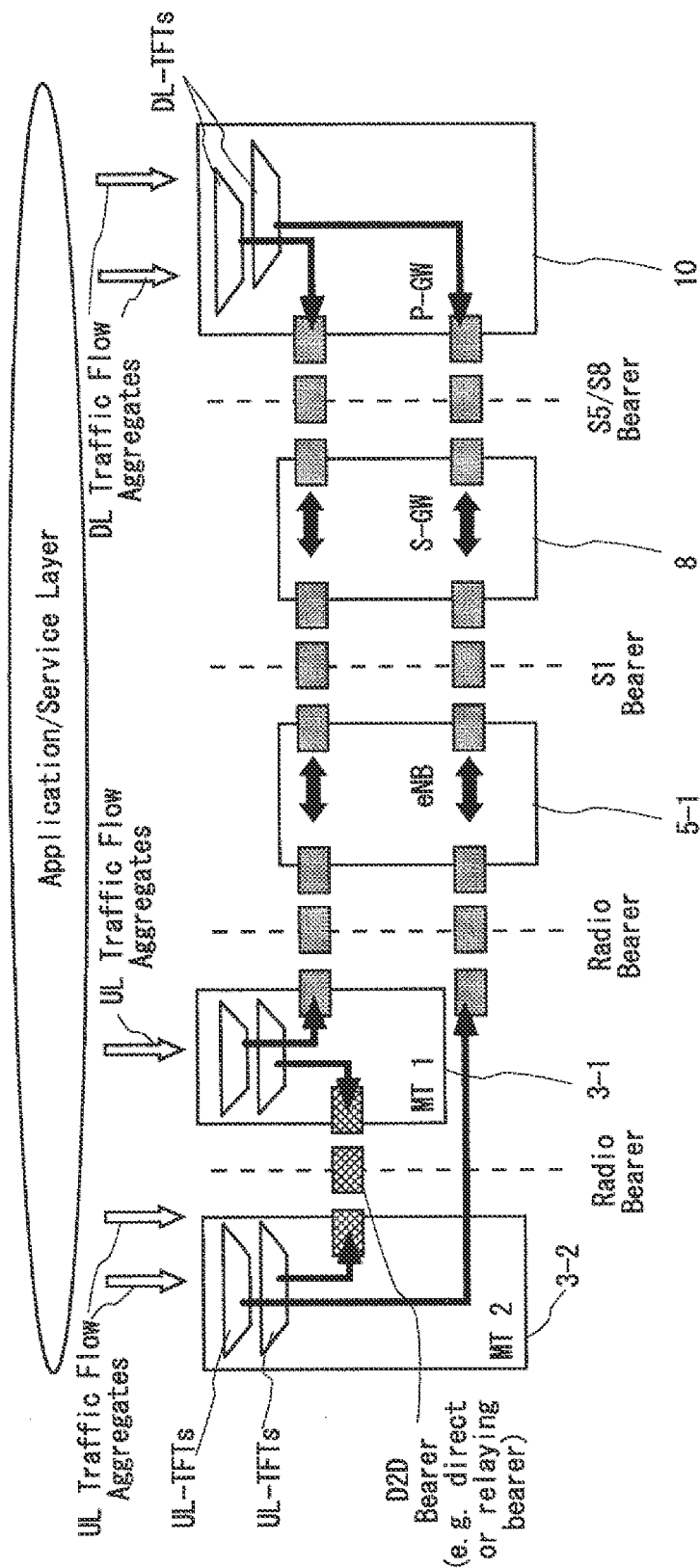
FIG. 2 illustrates an EPS bearer architecture used in the communication system illustrated in FIG. 1.

Before discussing the details of the embodiments of the present invention, it will be helpful to set out the architecture of the EPS bearers used to carry the data between the mobile communication devices 3 and the base stations 5/core network 7. FIG. 2 gives an example of the EPS architecture as extended to accommodate the direct (D2D) bearer (e.g. a relaying bearer) between the mobile communication devices 3. Further details can be found in 3GPP TS 23.401 V11.5.0, the contents of which are hereby incorporated by reference. In summary, an EPS bearer is realized by the following elements:

- In the mobile communication device 3, the UL TFT (Uplink Traffic Flow Template) maps a traffic flow aggregate to an EPS bearer in the uplink direction;
- In the PDN GW (Packet Data Network Gateway), the DL TFT (downlink Traffic Flow Template) maps a traffic flow aggregate to an EPS bearer in the downlink direction;
- A radio bearer (as defined in TS 36.300 V 11.5.0) is a radio link between two points, with a specific set of associated characteristics, such as quality of service, volume of traffic, frequency allocation, modulation scheme, synchronization, multiple-input and multiple-output (MIMO) configuration, etc. Radio bearers can be seen as channels provided by Layer-2 to higher layers for the transfer of either user data or control data. When a radio bearer is used for transmitting control data, it is referred to as a Signalling Radio Bearer (SRB). The radio bearer transports the packets of an EPS bearer between a mobile communication device and a base station 5. Whenever a mobile communication device 3 is using a service, the service is always associated with a radio bearer specifying the Layer-2 and Physical Layer configuration in order to define the associated transmission parameters. However, these associated parameters can be updated anytime during the lifetime of a radio bearer, depending on the current requirements imposed by the two endpoints of communication and the current availability of system resources. If a radio bearer exists, there is a one-to-one mapping between an EPS bearer and this radio bearer;
- An S 1 bearer transports the packets of an EPS bearer between a base station 5 and a Serving GW 8;
- An E-RAB (E-UTRAN Radio Access Bearer) refers to the concatenation of an S 1 bearer and the corresponding radio bearer, as defined in TS 36.300 V 11.5.0.
- An S 5/S 8 bearer transports the packets of an EPS bearer between the Serving GW 8 and the PDN GW 10;
- The mobile communication device 3 stores a mapping between an uplink packet filter and a radio bearer to create the mapping between a traffic flow aggregate and a radio bearer in the uplink;

The PDN GW 10 stores a mapping between a downlink packet filter and an S 5/S 8 bearer to create the mapping between a traffic flow aggregate and an S 5/S 8 bearer in the downlink;

The base station 5 stores a one-to-one mapping between a radio bearer and an S 1 Bearer to create the mapping between a radio bearer and an S 1 bearer in both the uplink and the downlink;

The Serving GW 8 stores a one-to-one mapping between an S 1 Bearer and an S 5/S 8 bearer to create the mapping between an S 1 bearer and an S 5/S 8 bearer in both the uplink and downlink.

The PDN GW 10 routes downlink packets to the different EPS bearers based on the downlink packet filters in the TFTs assigned to the EPS bearers in the PDN connection. Similarly, the mobile communication devices 3 route uplink packets to the different EPS bearers based on the uplink packet filters in the TFTs assigned to the EPS bearers in the PDN connection.

(EPS and Radio Bearers)

Figure 3:
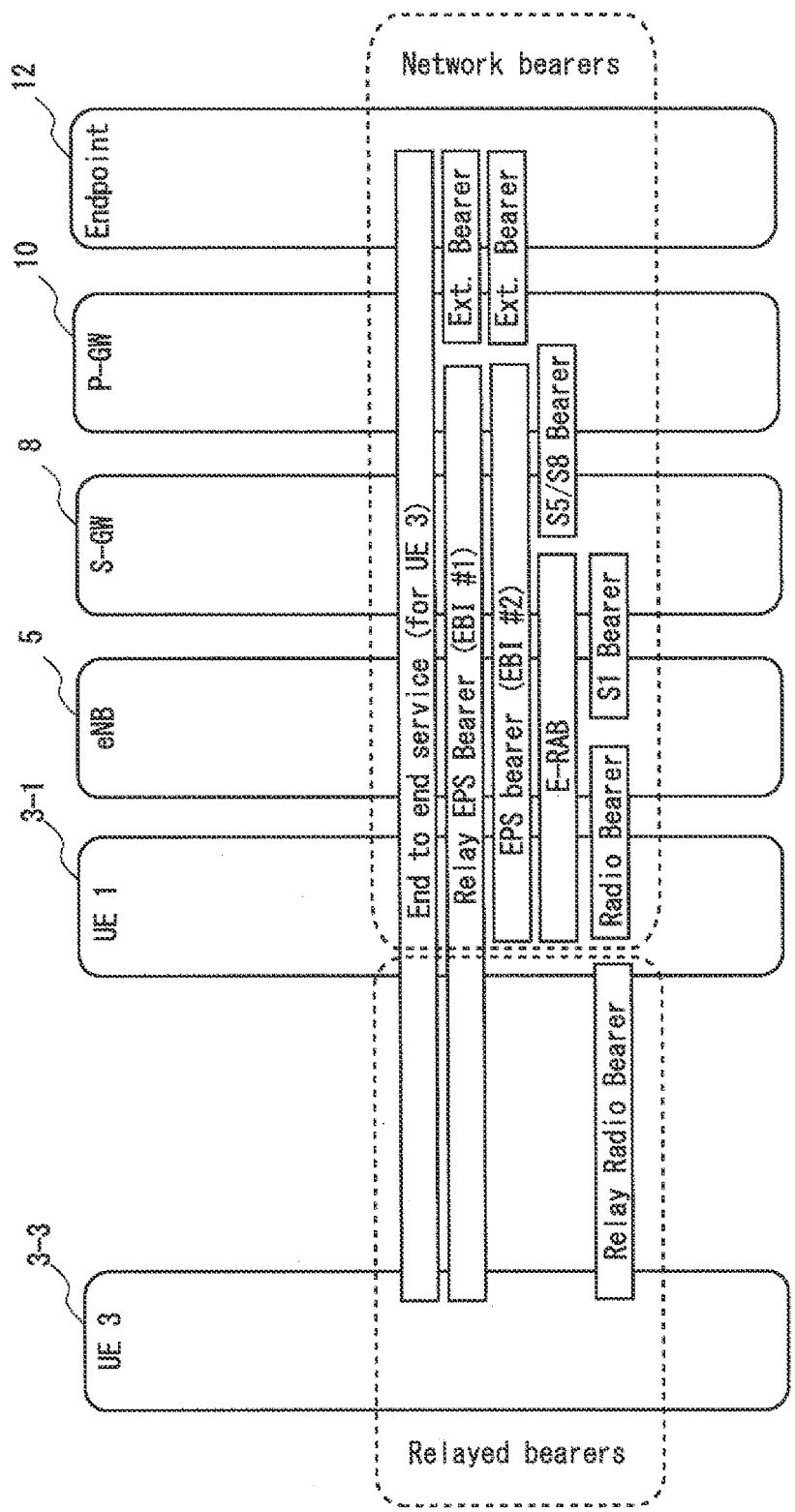
FIG. 3 illustrates schematically a relayed bearer structure compared to the core network routed bearer structure used in the communications system shown in FIG. 1.

FIG. 3 illustrates schematically a relayed bearer structure used in the communications system shown in FIG. 1.

Generally, in communications systems, a bearer can be defined as a pipeline connecting two or more points in the communications system, in which pipeline data flows. Thus an EPS bearer may be regarded as a pipeline for data to be sent across the Evolved Packet System (e.g. core network 7), i.e. between the mobile communication device 3-1 and the P-GW 10. In order to provide an end-to-end service for the mobile communication device 3-1, the P-GW 10 complements the EPS bearer with an external bearer (i.e. a bearer which is external to the core network 7) towards an endpoint 12 of communication (assuming that the other endpoint is not served by the core network 7). If the endpoint 12 is served by the core network 7, then the external bearer is substituted by the corresponding (and similarly formed) EPS bearer associated with the endpoint 12.

The EPS bearer used in LTE communications systems may be considered to be a plurality of components—an S 5/S 8 bearer between the P-GW 10 and the S-GW 8 and an E-UTRAN Radio Access Bearer (E-RAB) between S-GW 8 and the mobile communication device 3-1. The E-RAB may, itself, be further divided into an S 1 Bearer between the S-GW 8 and the base station 5, and a Radio Bearer between the base station 5 and the mobile communication device 3-1.

As can thus be seen, in order to provide an EPS Bearer over the core network 7, a number of bearer components and a number of network entities are used. Upon registration of the mobile communication devices 3 with the core network 7, the mobile communication devices 3 establish at least one, i.e. default, EPS Bearer and subsequently they may establish further EPS bearers, as needed, e.g. for each type of communication service used by a user of the mobile communication devices 3. Each EPS Bearer can have its own associated settings (e.g. an IP address, a set of data transmission characteristics, such as quality of service, data rate and flow control parameters, etc.) in order to provide support for the different requirements of different communication services.

The embodiments described herein make use of a 'Relay' Bearer comprising a Relay EPS bearer and a Relay radio bearer routed directly between the two mobile communication devices 3-1 and 3-3 and, in the case of the Relay EPS bearer, on to the P-GW 10.

As shown, an end to end service for the relayed mobile communication device can thus be implemented using the Relay EPS bearer between the mobile communication devices 3-1 and 3-3 and between the mobile communication device 3-3 and the P-GW 10 and other bearers to the end point 12.

(Loopback Scenarios)

Figure 4:
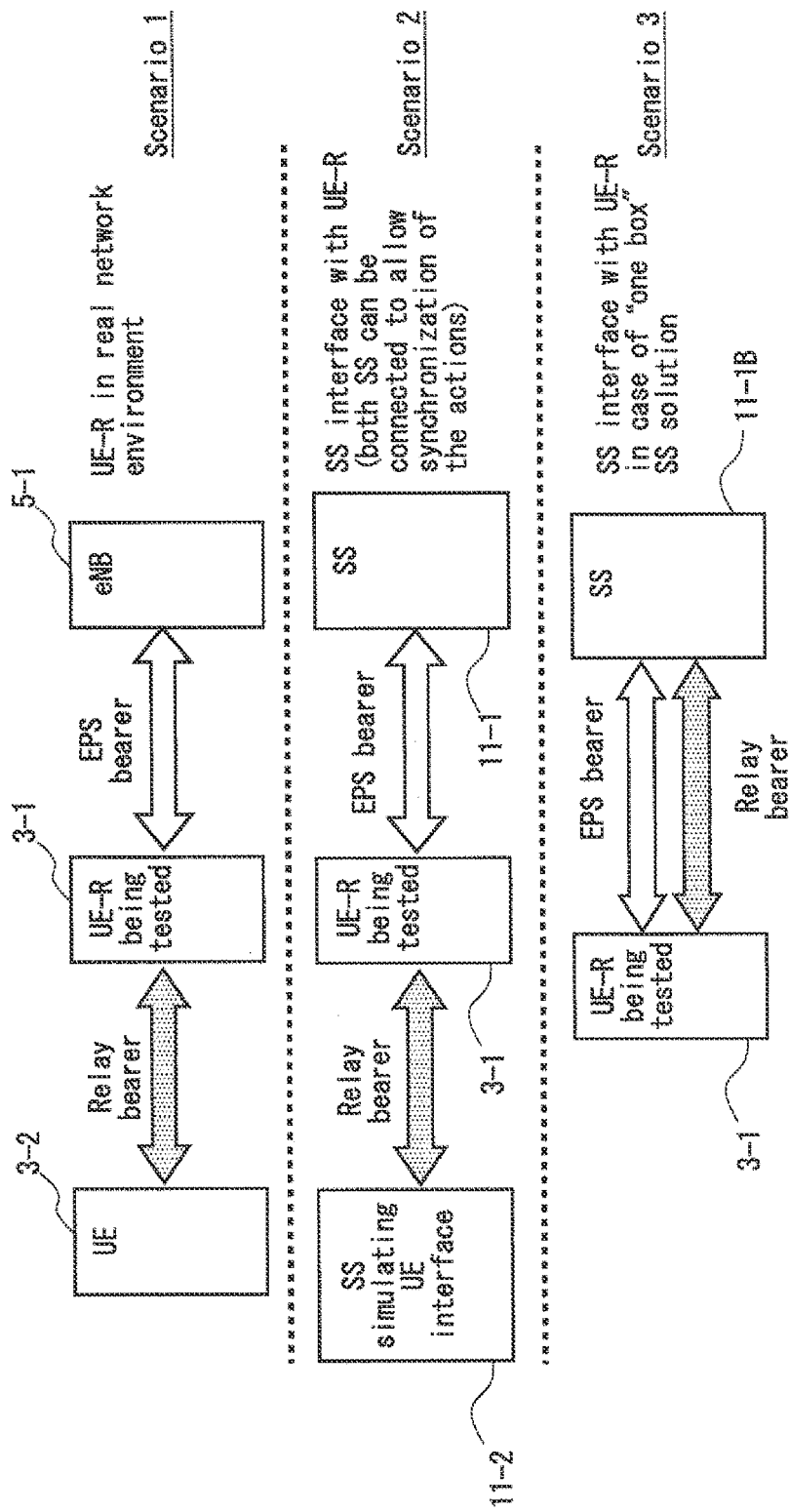
FIG. 4 illustrates schematically exemplary test environment scenarios for verifying compatibility of a mobile communication device with the communication system illustrated in FIG. 1.

FIG. 4 illustrates schematically exemplary test environment scenarios for verifying compatibility of a mobile communication device 3 with the communication system 1 illustrated in FIG. 1. In these scenarios, a mobile communication device 3-1, having relaying functionality, is being tested. The relaying mobile communication device 3-1 maintains a normal EPS bearer with the core network 7 (via a base station 5-1 or a suitably configured SS entity 11) and at the same time it also maintains a relay bearer for relaying communication from/to another mobile communication device 3-3 or a suitably configured SS entity 11.

As can be seen, in the first scenario, the mobile communication device 3-1 is tested using a conventional base station 5-1 and a conventional mobile communication device 3-2 in a real network environment. However, this setup may not provide sufficient feedback on a possible non-compliance and/or malfunction of the mobile communication device 3-1 being tested because the elements of this test setup have not been designed for the specific purpose of compliance testing, albeit they may support some (possibly limited) functionalities related to this kind of testing.

In the second scenario, the mobile communication device 3-1 is tested using two of the SS entities 11 for testing its regular EPS bearer(s) and its relay bearer, respectively. This setup provides sufficient feedback on a possible non-compliance and/or malfunction of the mobile communication device 3-1 being tested. However, it requires the two SS entities 11, which need to be synchronized during the compliance test, in order to provide reliable feedback on the mobile communication device's 3 operation.

In the third scenario, the mobile communication device 3-1 is tested using a single SS entity 11-1B for testing both the regular EPS bearer(s) and the relay bearer as a 'one-box' solution. This setup provides the most reliable feedback on a possible non-compliance and/or malfunction of the mobile communication device 3-1 being tested.

(System Simulator Entity)

Figure 5:
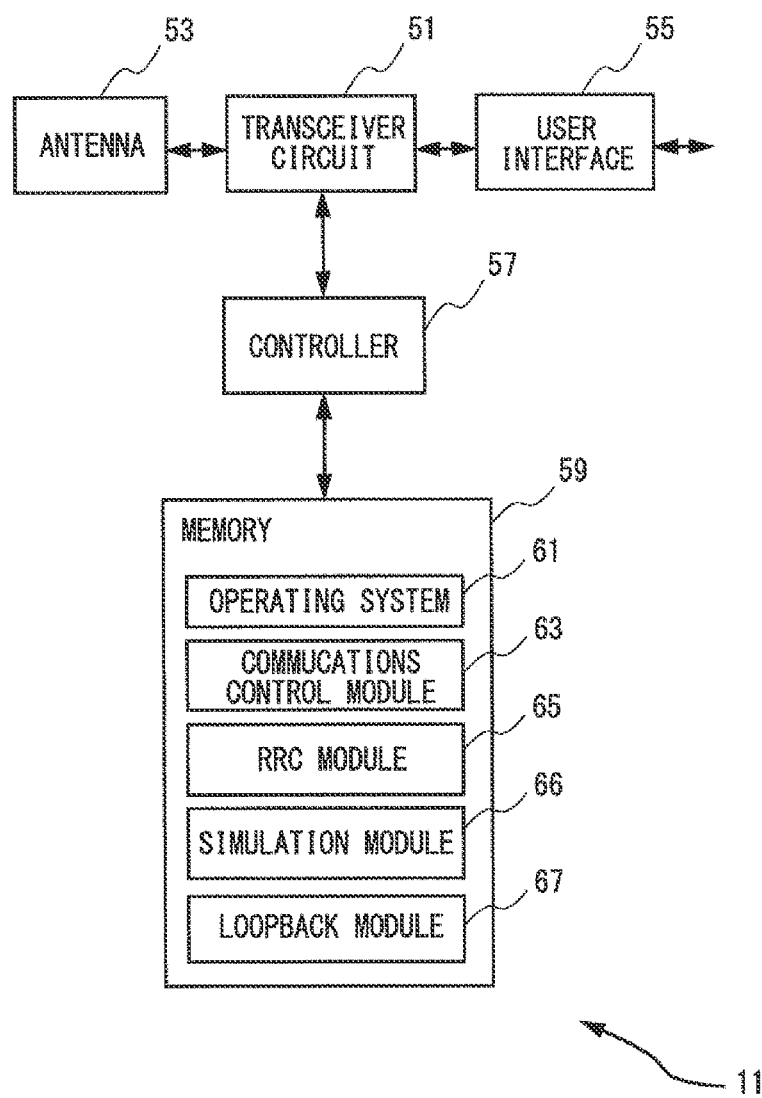
FIG. 5 is a functional block diagram illustrating some of the functionality of a test system entity forming part of the system shown in FIG. 3.

FIG. 5 shows a functional block diagram of the system simulator entity 11 shown in FIG. 1. As shown, the system simulator entity 11 has a transceiver circuit 51 for transmitting signals to and for receiving signals from other entities via one or more antenna 53. The system simulator entity 11 has a controller 57 to control the operation of the system simulator entity 11. The controller 57 is associated with a memory 59. Although not necessarily shown in FIG. 5, the system simulator entity 11 will of course have all the usual functionality of a conventional system simulator entity (such as a user interface 55) and this may be provided by any one or any combination of hardware, software and firmware, as appropriate. Software may be pre-installed in the memory 59 and/or may be downloaded via, for example, the communication system (communications network) 1 or from a removable data storage device (RMD). The controller 57 is configured to control the overall operation of the system simulator entity 11 by, in this example, program instructions or software instructions stored within the memory 59. As shown in FIG. 5, these software instructions include, among other things, an operating system 61, a communications control module 63, a radio resource control (RRC) module 65, a simulation module 66, and a loopback module 67.

The communications control module 63 is operable to handle (e.g. generate, send and receive) control signals for controlling the connections between the system simulator entity 11 and mobile communication devices 3 and/or any of other test equipment entities. The communications control module 63 also controls the separate flows of uplink data and control data that are to be transmitted to the mobile communication devices 3.

The RRC module 65 is operable to handle (e.g. generate, send and receive) control signals formatted according to the RRC protocol. The RRC module 65 is also operable to include in an RRC signalling message for the mobile communication device 3 Non-Access Stratum (NAS) signalling for identifying an EPS bearer of that mobile communication device 3 to be associated with a specific loopback test.

The simulation module 66 controls the behaviour of the system simulator entity 11 to cause the system simulator entity 11 to perform the functions of any specific network entity when required to do so (e.g. base station, core network entities, and/or mobile devices).

The loopback module 67 is operable to interface with the corresponding module of the device being tested (e.g. a loopback module 89 of the mobile communication device 3) and thereby monitor the operation of the device being tested, e.g. based on the data units sent/received by that device.

(Mobile Communication Device)

Figure 6:
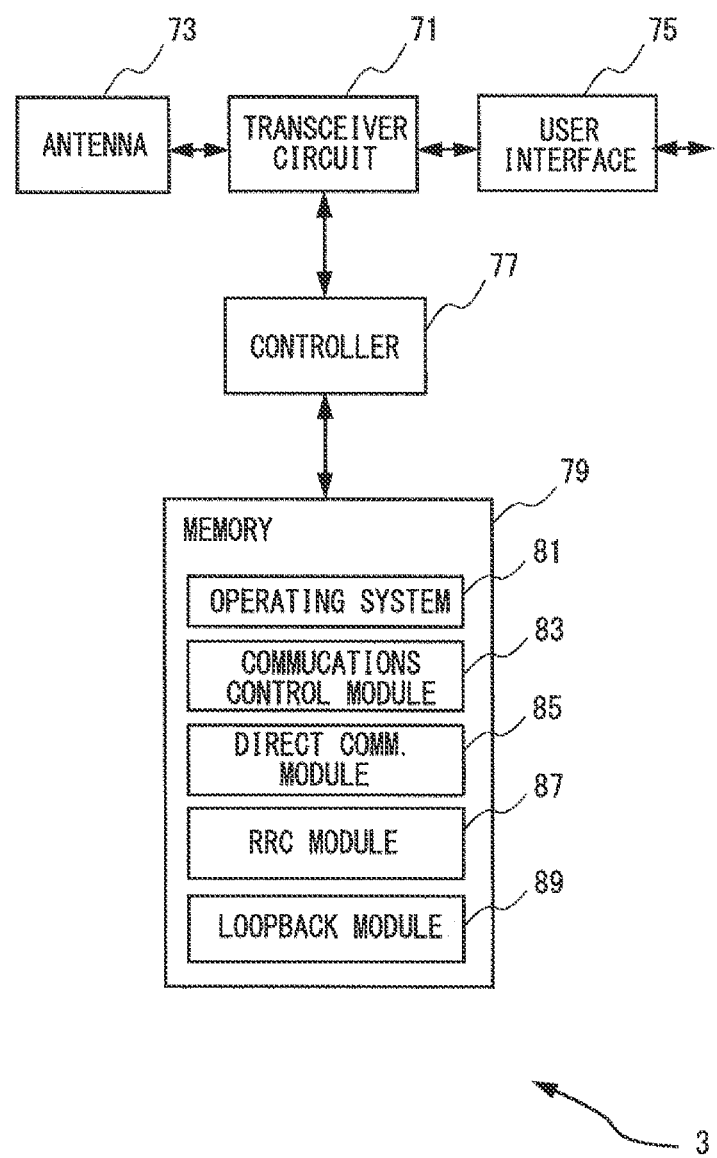
FIG. 6 is a functional block diagram illustrating some of the functionality of a mobile communication device forming part of the system shown in FIG. 1.

FIG. 6 shows a functional block diagram of the relaying mobile communication device 3-1 shown in FIG. 1. As shown in FIG. 6, the mobile communication device 3 has a transceiver circuit 71 that is operable to transmit signals to and to receive signals from a base station 5 and/or another mobile communication device 3 (and/or an SS entity 11 configured as a base station/mobile communication device) via one or more antenna 73. The mobile communication device 3 has a controller 77 to control the operation of the mobile communication device 3. The controller 77 is associated with a memory 79 and is coupled to the transceiver circuit 71. Although not necessarily shown in FIG. 6, the mobile communication device 3 will of course have all the usual functionality of a conventional mobile communication device 3 (such as a user interface 75) and this may be provided by any one or any combination of hardware, software and firmware, as appropriate. Software may be pre-installed in the memory 79 and/or may be downloaded via, for example, the telecommunications network or from a removable data storage device (RMD).

The controller 77 is configured to control overall operation of the mobile communication device 3 by, in this example, program instructions or software instructions stored within memory 79. As shown in FIG. 6, these software instructions include, among other things, an operating system 81, a communications control module 83, a direct communication module 85, an RRC module 87, and a loopback module 89.

The communications control module 83 is operable to handle (e.g. generate, send and receive) control signals for controlling the connections between the mobile communication device 3 and other mobile communication devices 3, the base station 5, or the SS entity 11 (simulating a mobile communication device and/or a base station). The communications control module 83 also controls the separate flows of uplink data and control data that are to be transmitted to the other mobile communication device 3, the base station 5, and the SS entity.

The direct communication module 85 is operable to instruct the communications control module 83 to set up a device-to-device communication path (e.g. to support a ProSe based relaying functionality).

The RRC module 87 is operable to handle (e.g. generate, send and receive) control signals formatted according to the RRC protocol. The RRC module 87 is also operable to identify in an RRC signalling message received from the SS entity 11 information identifying any EPS bearer of the mobile communication device 3 to be associated with a loopback function.

The loopback module 89 is operable to manage (e.g. setup, modify, terminate) communication bearers for looping back to the corresponding module of the SS entity 11 (i.e. the loopback module 67) and thereby facilitating monitoring data units sent/received by the mobile communication device 3.

(Operation)

A more detailed description will now be given (with reference to FIG. 7 and FIG. 8) of testing a mobile communication device 3 implementing proximity based services.

Figure 7:
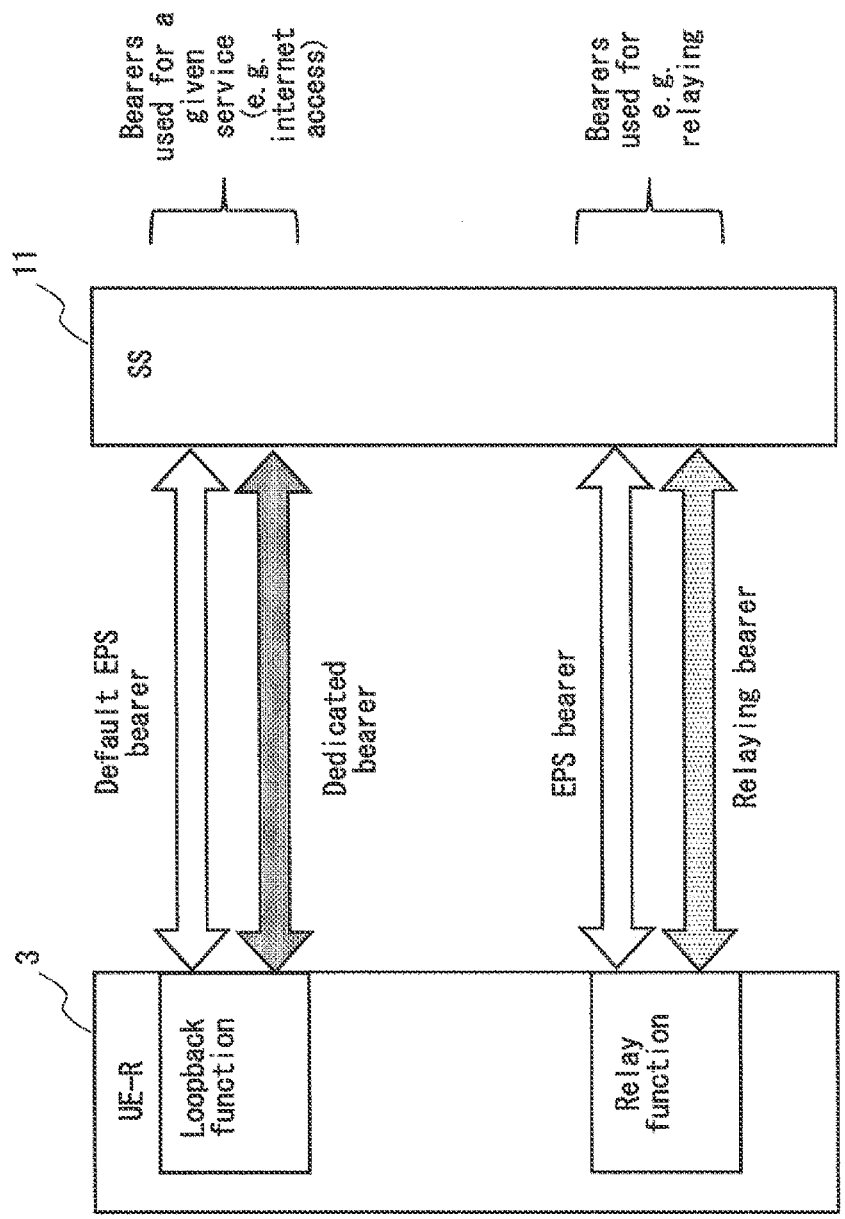
FIG. 7 illustrates schematically a test environment according to an embodiment of the invention for verifying compatibility of a mobile communication device with the communication system illustrated in FIG. 1.

FIG. 7 illustrates schematically a test environment according to an embodiment of the invention for verifying compatibility of a mobile communication device 3 with the communication system 1 illustrated in FIG. 1.

In particular, testing of the mobile communication device 3 is shown. Some of the mobile communication device's 3 bearers that are not associated with the relay function are connected to the loopback function of the mobile communication device 3 whilst, in the example of FIG. 7, bearers related to the relaying function operate independently as if the test mode was not activated in the mobile communication device 3.

The ability to apply selective loop-back in which the normal operation of some bearers are maintained whilst others are tested using loop-back functionality is achieved by using dedicated identifiers to individually specify the EPS bearers according to their identity (e.g. the EPS bearer identity as specified in TS 24.301-9.3.2).

A possible, purely exemplary, implementation of this new identification information is given in 1 below:

TABLE 1

| 8 | 7 | 6 | 5 | 4 | 3 | 2 | 1 | |
|---|---|---|---|---|---|---|---|---|
| EBI (7) | EBI (6) | EBI (5) | EBI (4) | EBI (3) | EBI (2) | EBI (1) | EBI (0) | octet 1 |
| EBI (15) | EBI (14) | EBI (13) | EBI (12) | EBI (11) | EBI (10) | EBI (9) | EBI (8) | octet 2 |

As can be seen, Table 1 shows sixteen EPS bearers each having an associated EPS Bearer Identity (EBI). The respective EBIs can be identified using two octets (bytes) of an information element for identifying the individual bearers for testing. For example, selective loopback functionality may be implemented by setting the bit corresponding to the EBI of the EPS bearer, for which a loopback function needs to be activated, to an appropriate value (e.g. '1', when '1' indicates loopback for the EPS bearer identified by the bit representing that EBI).

Since the above indication comprises a relatively low amount of information, it would be beneficial to include it in a signalling message sent to the mobile communication device 3 for activating the loopback functionality for the selected EPS bearer.

For example, in this embodiment, the EBI is included in a two octet information element (IE) in a loop-back control message for activating/deactivating loop-back functionality for specific EPS bearers (e.g. CLOSE UE TEST LOOP and/or an OPEN UE TEST LOOP message), which may be transmitted in the appropriate NAS message using appropriate RRC signalling.

In a modification to this embodiment, a loopback mode may be applied based on Access Point Name (APN). In this case, the APN to which the loopback mode is to be applied (or to which the loopback mode is not to be applied) is indicated to the mobile communications device 3 (i.e. instead of or in addition to an indication of any EPS bearers as described above). In this case, the SS entity 11 may provide an indication of a particular APN by identifying the default bearer for that APN (i.e. setting the bit corresponding to that bearer to the value representing loopback activation). When the mobile communications device 3 receives the indication of (a default bearer for) an APN, the mobile communications device 3 applies loopback functionality to the indicated default EPS bearer and any dedicated EPS bearer(s) associated with that APN.

Figure 8:
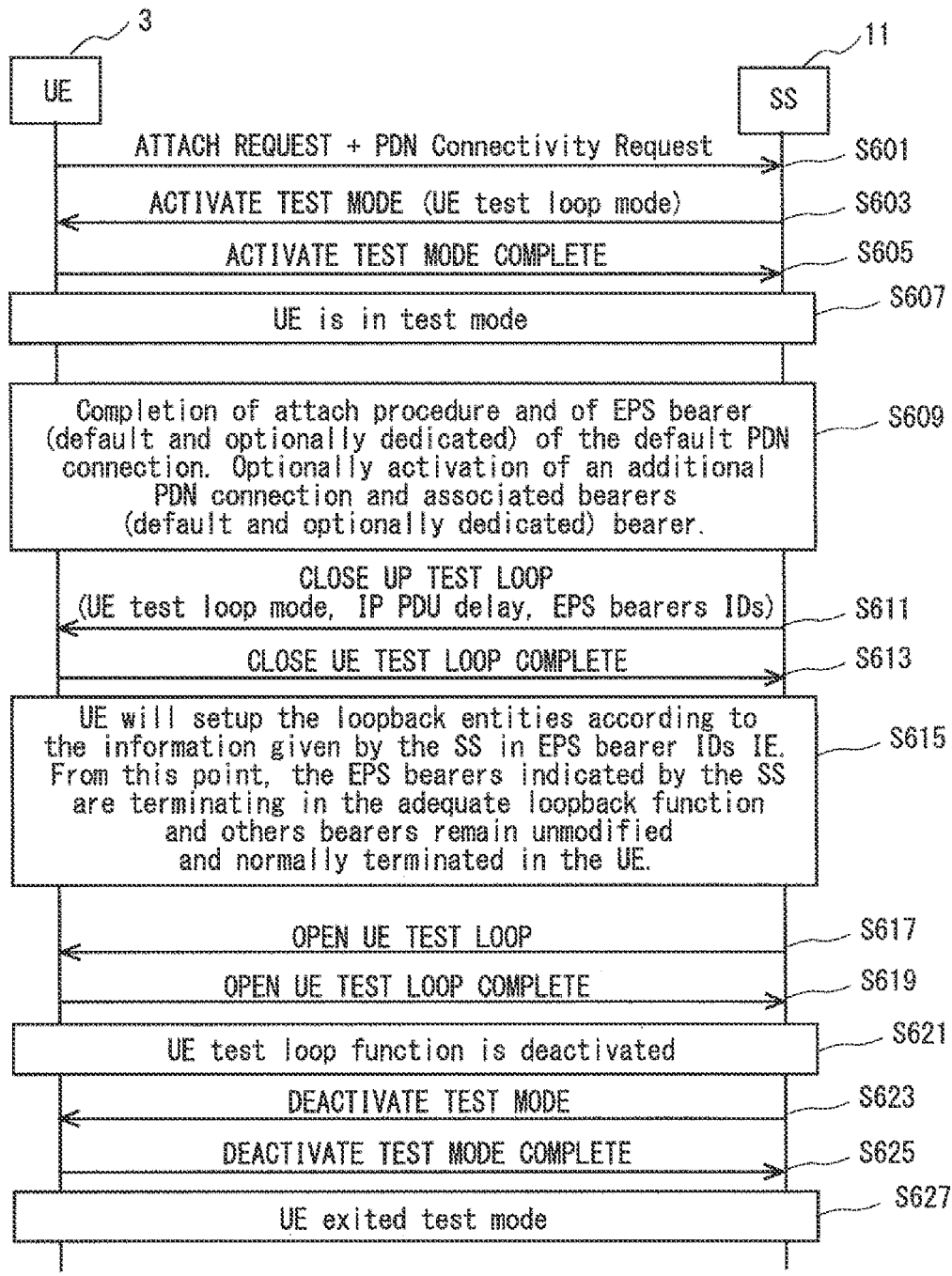
FIG. 8 is a timing diagram illustrating the way in which the test system entity controls the activation of a loopback connection for the mobile communication device according to an embodiment of the invention.

FIG. 8 is a timing diagram illustrating the way in which the test system entity (SS entity) 11 controls the activation and deactivation of a loopback connection for a mobile communication device 3.

Initially, in step S601, the mobile communication device 3 initiates an attach procedure and indicates that it is trying to establish a PDN connection with the core network 7. This procedure is carried out by the mobile communication device 3 (using its RRC module 87) generating and sending (via the transceiver circuit 71) to the SS entity 11 an appropriately formatted ATTACH REQUEST message, including in this message a 'PDN Connectivity Request' as well. It will be appreciated that the mobile communication device 3 might have intended to send this message to a network entity (e.g. the MME 9) different from the SS entity 11.

However, since in this embodiment a compliance test is to be performed, the SS entity 11 generates and transmits (using its RRC module 65 and transceiver circuit 51) an ACTIVATE TEST MODE message embedded in a suitable downlink RRC message for transferring non-RRC messages (e.g. a 'DLInformationTransfer message') to the mobile communication device 3 (at step S603) to activate the test mode in the mobile communication device 3 prior to any bearer activation. Rather than use one of the three conventional test modes (A, B or C) by setting the appropriate IE (e.g. the "UE test loop mode" IE) to the value associated with that test mode, a different value may be used to initiate a new test mode for use with selective EPS bearer loop-back testing functionality. However, it will be appreciated that one of the conventional test modes (A, B, or C) may also be associated with the new test mode for use with selective EPS bearer loop-back testing functionality. This may be achieved, for example, by including an appropriate information element, in the RRC message and/or the non-RRC message, specifying the modified use of the conventional test mode indicated in that message.

In step S605, in response to the preceding message, the mobile communication device 3 generates and transmits (using its RRC module 87 and transceiver circuit 71) an ACTIVATE TEST MODE COMPLETE message embedded in an appropriate uplink transfer RRC message (e.g. an 'ULInformationTransfer' message) sent to the SS entity 11 to confirm that activation of the test mode was successful.

As indicated generally at S607, the mobile communication device 3 is now in the test mode.

Next, as shown generally at S609, the SS entity 11 (acting as or liaising with a corresponding network entity) performs the necessary actions to accommodate the mobile communication device's 3 request in step S601. As a result of this step, the mobile communication device 3 establishes an active EPS bearer with the SS entity 11 (although the mobile communication device 3 might recognize this as a default and/or dedicated EPS bearer with the PGW 10).

In step S611, the SS entity 11 generates and transmits (using its RRC module 65 and transceiver circuit 51) a CLOSE UE TEST LOOP message embedded in a, for example, a 'DLInformationTransfer' RRC message (generated by its RRC module 65) to enter the mobile communication device 3 into test loop mode. The SS entity 11 indicates the same value for the UE test loop mode IE that was used in step S603. In this embodiment, the SS entity 11 also includes in this message, e.g. as described above with respect to Table 1, an information element identifying the EBI(s) for which a selective loopback function should be applied by the mobile communication device 3.

In step S613, the mobile communication device 3 generates and transmits (using its RRC module 87 and transceiver circuit 71) a CLOSE UE TEST LOOP COMPLETE message (e.g embedded in an 'ULInformationTransfer' RRC message) to the SS entity 11 in order to confirm that loopback entities for the selected EPS bearer(s) have been created and loop back (via its loopback module 89) has been activated for the identified (selected) EPS bearers.

As indicated at S615, the mobile communication device 3 is operable to setup its loopback function according to the information received (in step S611) in the 'EPS Bearer ID' IE from the SS entity 11. From this point and until deactivation of the loopback function, the EPS bearer(s) indicated by the SS entity 11 are terminated in the loopback module 89, whilst termination of other bearers remains unmodified (e.g. in the direct communication module 85 and/or the communications control module 83).

In step S617, the SS entity 11 generates and transmits (using its RRC module 65 and transceiver circuit 51) an OPEN UE TEST LOOP message to the mobile communication device 3 (e.g,, embedded in a 'DLInformationTransfer' RRC message), which causes the mobile communication device 3 to deactivate its test loop entities.

In step S619, the mobile communication device 3 generates and transmits (using its RRC module 87 and transceiver circuit 71) an OPEN UE TEST LOOP COMPLETE message to the SS entity 11 (e.g. embedded in an 'ULInformationTransfer' RRC message) to confirm that deactivation of the test loop entities has been successful.

As indicated at S621, the UE test loop is now successfully deactivated.

In step S623, the SS entity 11 generates and sends (using its RRC module 65 and transceiver circuit 51) to the mobile communication device 3 a DEACTIVATE TEST MODE message (e.g. embedded in a 'DLInformationTransfer' RRC message). The purpose of this procedure is to deactivate UE test mode and return the UE to normal operation as per the prior art.

In step S625, a DEACTIVATE TEST MODE COMPLETE is sent by the UE to the SS (e.g. embedded in an 'ULInformationTransfer' RRC message) to confirm completion of the deactivation of the UE test mode. In step S627, the UE exited test mode.

A clear benefit of the above proposal is to allow the possibility to evaluate new functions prior to releasing a mobile communication device (or other user equipment) to the market. This method could also be used with existing services such as the services provided via the IP Multimedia Subsystem (IMS). The proposal makes it possible to define any multi-service test case (TC) configuration for verifying compliance with LTE and/or e.g. IMS services, while other data services (e.g. internet) are looped back to the SS entity 11.

(Modifications and Alternatives)

Detailed embodiments have been described above. As those skilled in the art will appreciate, a number of modifications and alternatives can be made to the above embodiments whilst still benefiting from the inventions embodied therein. By way of illustration, only a number of these alternatives and modifications will now be described.

In the above embodiments, two mobile communication devices were allowed to establish a relayed or other direct or locally routed connection with each other. However, as those skilled in the art will appreciate, such connections may be established between three or more mobile communication devices, so that the users of the mobile communication devices may be connected together in a conference call setup.

In the above embodiments, the mobile communication devices are cellular telephones. However, other types of user devices such as, for example, MTC (Machine Type Communication) devices, smartphones, personal digital assistants, laptop computers, web browsers, etc. could be used.

Although the relayed or other direct communication paths between mobile communication devices within the same communications network have been described, the proximity based communication paths according to the invention may be set up between mobile communication devices located in different communications networks. In this case, the mobility management entities (and in some cases the base stations) for the respective mobile communication devices are also located in different networks. The SS entity may be operable to test such scenarios as well.

In the above embodiments, relayed communication paths which use an LTE technology (i.e. the same communications technology that is used between the base station and the relaying mobile communication device) have been described. However, it will be appreciated that a communication path may be relayed using any communications technology, for example, Wi-Fi, Bluetooth, etc. (irrespective of the communications technology used between the base station and the relaying mobile communication device).

In the above description of step S617, the SS entity 11 generates and transmits an OPEN UE TEST LOOP message which causes the mobile communication device 3 to completely deactivate its test loop entities. However, it will be appreciated that the test loops entities may be deactivated selectively, e.g. by including the EBI(s) of those EPS bearers that are to be removed from the loopback module 89 of the mobile communication device 3, whilst keeping other already looped EPS bearers unchanged. For example, the selective loopback functionality may be deactivated for any particular EPS bearer by setting the EBI of that EPS bearer to a value the same as or different from the value associated with loopback activation (e.g.: a '0' for deactivation when '1' indicates activation; or a '1' to change the state of an EPS bearer for which loopback has previously been activated to a state in which loopback is deactivated).

In the above description, the system simulator entity 11 is described as a being used for compliance testing of a mobile communication device 3. However, it will be appreciated that the system simulator entity 11 may also be used for testing a base station 5 handling (and/or the PGW 10 terminating) the non-relaying EPS bearers for mobile communication devices 3 involved in proximity based services.

In the above description, the system simulator entity 11 is described as a standalone entity. However, it will be appreciated that the system simulator entity 11 may be implemented as part of another apparatus. For example, the system simulator entity 11 may form part of the base station 5. In this case, it will be appreciated that it will be advantageous for the base station 5 to control the loopback function of the mobile communication device 3 for testing compliance and/or performance of proximity based services (e.g. before activating such services for that mobile communication device 3).

In an alternative embodiment, the loopback mode may be selectively applied for any given functionality and/or service of the mobile communication device. In this case, the SS entity provides an identification of any selected functionality and/or service to be associated with the loopback module (instead of, or in addition to an identification of any EPS bearer) and the mobile communication device (e.g. its loopback module 89) applies the loopback function to the identified functionality and/or service.

It will also be appreciated that the mobile communication device may be configured to restrict application of the loopback function to certain functionalities and/or services by specification. In this case, the mobile communication device may apply the loopback function to only those functionalities and/or services that are not restricted, irrespective of the identification of functionalities and/or services provided by the SS entity.

In the above description, the system simulator entity 11 and the mobile communication devices 3 are described for ease of understanding as having a number of discrete functional components or modules. Whilst these modules may be provided in this way for certain applications, for example, where an existing system has been modified to implement the invention, in other applications, for example in systems designed with the inventive features in mind from the outset, these modules may be built into the overall operating system or code, and so these modules may not be discernible as discrete entities.

In the above embodiments, a number of software modules were described. As those skilled in the art will appreciate, the software modules may be provided in a compiled or un-compiled form and may be supplied to the mobility management entity, to the base station, or to the mobile communication device as a signal over a computer network, or on a recording medium. Further, the functionality performed by part or all of this software may be performed using one or more dedicated hardware circuits. However, the use of software modules is preferred as it facilitates the updating of the mobility management entity 9, the base stations 5 and the mobile communication devices 3 in order to update their functionalities.

Various other modifications will be apparent to those skilled in the art and will not be described in further detail here.

(Glossary Of 3Gpp Terms)
D2D—Device to Device
eNB—Evolved NodeB, E-UTRAN base station
EPC—Evolved Packet Core
EPS—Evolved Packet System
E-UTRA—Evolved UMTS Terrestrial Radio Access
E-UTRAN—Evolved UMTS Terrestrial Radio Access Network
HSS—Home Subscriber Server
LB—Loopback
LTE—Long Term Evolution (of UTRAN)
MME—Mobility Management Entity NAS—Non-Access-Stratum
OAM—Operation And Maintenance
P-GW—PDN Gateway
ProSe—Proximity-based Services
(E-)RAB—(EPS-) Radio Access Bearer
RRC—Radio Resource Control
S1-MME—S1 for the control plane
S1-U—S1 for the user plane
S-GW—Serving Gateway
SS—System Simulator
TFT—Traffic Flow Template
UE—User Equipment
UMTS—Universal Mobile Telecommunications System Various other modifications will be apparent to those skilled in the art and thus will not be described in further detail here.

This software can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

The whole or part of the exemplary embodiments disclosed above can be described as, but not limited to, the following supplementary notes.

(Supplementary note 1)

A communication device for communicating with a communication network test device operable to monitor operation of said communication device, the communication device comprising:

means for operating a plurality of communication bearers associated with said communication device;

means for determining a subset comprising at least one communication bearer, selected from said plurality of communication bearers, to be used when performing a test and not comprising at least one other communication bearer of said plurality of communication bearers; and means for communicating with the communication network test device in pursuance of a test in which each communication bearer in said subset is used and each communication bearer not in said subset is not used.

(Supplementary note 2)

The communication device according to Supplementary note 1, further comprising means for receiving a message, from said communication network test device, the message comprising data identifying each communication bearer in said subset, wherein said determining means is operable to determine said subset based on said data identifying each communication bearer in said subset.

(Supplementary note 3)

The communication device according to Supplementary note 1, further comprising means for receiving a message, from said communication network test device, the message comprising data identifying each communication bearer not in said subset, wherein said determining means is operable to determine said subset based on said data identifying each communication bearer not in said subset.

(Supplementary note 4)

The communication device according to Supplementary note 2or 3, wherein said message comprises a bit pattern with at least one respective bit associated with each communication bearer of said plurality of communication bearers associated with said communication device.

(Supplementary note 5)

The communication device according to Supplementary note 4, wherein each said bit is set to a predetermine value if said communication bearer is in said subset.

(Supplementary note 6)

The communication device according to Supplementary note 2or 3, wherein said message comprises a bit pattern with at least one respective bit associated with a default communication bearer of said plurality of communication bearers associated with said communication device.

(Supplementary note 7)

The communication device according to Supplementary note 6, wherein each said bit is set to a predetermine value if said default communication bearer and any associated communication bearer is in said subset.

(Supplementary note 8)

The communication device according to any of Supplementary notes 2to 7, wherein said message comprises a bearer identifier (e.g. an Evolved Packet System, EPS, Bearer ID or EBI) for each communication bearer of said subset.

(Supplementary note 9)

The communication device according to any of Supplementary notes 2to 8, wherein said message comprises a Non-Access Stratum, NAS, message.

(Supplementary note 10)

The communication device according to Supplementary note 9wherein said NAS message is embedded in at least one Radio Resource Control, RRC, message.

(Supplementary note 11)

The communication device according to Supplementary note 10, wherein said at least one message comprises a downlink information transfer message.

(Supplementary note 12)

The communication device according to any of Supplementary notes 1to 11, wherein said test is a loop-back test.

(Supplementary note 13)

The communication device according to any of Supplementary notes 1to 12, wherein said communicating means is operable to receive test packets from said communication network test device using said at least one communication bearer of said subset.

(Supplementary note 14)

The communication device according to any of Supplementary notes 1to 13, wherein said communicating means is operable to send, as part of said test, test packets to said communication network test device.

(Supplementary note 15)

The communication device according to any of Supplementary notes 1to 14, wherein said plurality of communication bearers comprise at least one EPS communication bearer.

(Supplementary note 16)

The communication device according to any of Supplementary notes 1to 15, wherein said determining means is operable to select communication bearers for said subset to be communication bearers that are not associated with at least one specific functionality of said communication device (e.g. a relay functionality or non-relay functionality).
(Supplementary note 17)
The communication device according to any of Supplementary notes 1to 16, wherein said determining means is operable to select communication bearers for said subset to be communication bearers that are associated with at least one specific functionality of said communication device (e.g. a relay functionality or non-relay functionality).
(Supplementary note 18)
The communication device according to any of Supplementary notes 1to 17, wherein said determining means is operable to determine, when said test has been initiated, at least one communication bearer of said subset for which said test is to be terminated.
(Supplementary note 19)
The communication device according to Supplementary note 18, wherein said communicating means is operable to initiate termination of said at least one communication bearer of said subset for which said test is to be terminated.
(Supplementary note 20)
The communication device according to Supplementary note 19, wherein said communicating means is operable to receive a message to terminate said test, from said communication network test device, the message to terminate said test comprising data identifying each communication bearer for which said test is to be terminated.
(Supplementary note 21)
The communication device according to Supplementary note 20, wherein said message to terminate said test comprises a bit pattern with at least one respective bit associated with each communication bearer of said plurality of communication bearers associated with said communication device.
(Supplementary note 22)
The communication device according to Supplementary note 21, wherein each said bit is set to a predetermined value if said test is to be terminated for said communication bearer.
(Supplementary note 23)
The communication device according to Supplementary note 20or 21, wherein said message comprises a bearer identifier (e.g. an EPS Bearer ID or EBI) for each communication bearer of said subset for which said test is to be terminated.
(Supplementary note 24)
The communication device according to any of Supplementary notes 20to 23, wherein said message comprises a NAS message.
(Supplementary note 25)
The communication device according to Supplementary note 24, where said NAS message is embedded in at least one RRC message.
(Supplementary note 26)
The communication device according to Supplementary note 25, said at least one message comprises a downlink information transfer message.
(Supplementary note 27)
A communication network test device for monitoring operation of a communication device, the test device comprising:
means for communicating with said communication device;
means for identifying each of a plurality of communication bearers associated with said communication device;
means for determining a subset comprising at least one communication bearer, selected from said plurality of communication bearers, to be used when performing a test and not comprising at least one other communication bearer of said plurality of communication bearers; and
means for initiating a test in which each communication bearer in said subset is used and each communication bearer not in said subset is not used.
(Supplementary note 28)
The communication network test device according to Supplementary note 27, wherein said initiating means is operable to send a message, to said communication device, the message comprising data identifying each communication bearer in said subset.
(Supplementary note 29)
The communication network test device according to Supplementary note 27, wherein said initiating means is operable to send a message, to said communication device, the message comprising data identifying each communication bearer not in said subset.
(Supplementary note 30)
The communication network test device according to Supplementary note 28or 29, wherein said message comprises a bit pattern with at least one respective bit associated with each communication bearer of said plurality of communication bearers associated with said communication device.
(Supplementary note 31)
The communication network test device according to Supplementary note 30, wherein each said bit is set to a predetermine value if said communication bearer is in said subset.
(Supplementary note 32)
The communication network test device according to Supplementary note 28or 29, wherein said message comprises a bit pattern with at least one respective bit associated with a default communication bearer of said plurality of communication bearers associated with said communication device.
(Supplementary note 33)
The communication network test device according to Supplementary note 32, wherein each said bit is set to a predetermine value if said default communication bearer and any associated communication bearer is in said subset.
(Supplementary note 34)
The communication network test device according to any of Supplementary notes 28to 33, wherein said message comprises a bearer identifier (e.g. an Evolved Packet System, EPS, Bearer ID or EBI for each communication bearer of said subset.
(Supplementary note 35)
The communication network test device according to any of Supplementary notes 28to 34, wherein said message comprises a Non-Access Stratum, NAS, message.
(Supplementary note 36)
The communication network test device according to Supplementary note 35, wherein said NAS message is embedded in at least one Radio Resource Control, RRC, message.
(Supplementary note 37)
The communication network test device according to Supplementary note 36, wherein said at least one message comprises a downlink information transfer message.
(Supplementary note 38)
The communication network test device according to any of Supplementary notes 27to 37, wherein said test initiated by said initiating means is a loop-back test.
(Supplementary note 39)
The communication network test device according to any of Supplementary notes 27to 38, wherein said communicating means is operable to send test packets to said communication device using said at least one communication bearer of said subset.

(Supplementary note 40)
The communication network test device according to any of Supplementary notes 27 to 39, wherein said communicating means is operable to receive, as part of said test, test packets from said communication device.

(Supplementary note 41)
The communication network test device according to any of Supplementary notes 27 to 40, wherein said plurality of communication bearers comprise at least one EPS communication bearer.

(Supplementary note 42)
The communication network test device according to any of Supplementary notes 27 to 41, wherein said determining means is operable to select communication bearers for said subset to be communication bearers that are not associated with at least one specific functionality of said communication device (e.g. a relay functionality or non-relay functionality).

(Supplementary note 43)
The communication network test device according to any of Supplementary notes 27 to 42, wherein said determining means is operable to select communication bearers for said subset to be communication bearers that are associated with at least one specific functionality of said communication device (e.g. a relay functionality or non-relay functionality).

(Supplementary note 44)
The communication network test device according to any of Supplementary notes 27 to 43, wherein said determining means is operable to determine, when said test has been initiated, at least one communication bearer of said subset for which said test is to be terminated.

(Supplementary note 45)
The communication network test device according to Supplementary note 44, wherein said initiating means is operable to initiate termination of said at least one communication bearer of said subset for which said test is to be terminated.

(Supplementary note 46)
The communication network test device according to Supplementary note 45, wherein said initiating means is operable to send a message to terminate said test, to said communication device, the message to terminate said test comprising data identifying each communication bearer for which said test is to be terminated.

(Supplementary note 47)
The communication network test device according to Supplementary note 46, wherein said message to terminate said test comprises a bit pattern with at least one respective bit associated with each communication bearer of said plurality of communication bearers associated with said communication device.

(Supplementary note 48)
The communication network test device according to Supplementary note 47, wherein each said bit is set to a predetermined value if said test is to be terminated for said communication bearer.

(Supplementary note 49)
The communication network test device according to any of Supplementary notes 46 to 48, wherein said message comprises a bearer identifier (e.g. an EPS Bearer ID or EBI) for each communication bearer of said subset for which said test is to be terminated.

(Supplementary note 50)
The communication network test device according to any of Supplementary notes 46 to 49, wherein said message comprises a NAS message.

(Supplementary note 51)
The communication network test device according to Supplementary note 50, where said NAS message is embedded in at least one RRC message.

(Supplementary note 52)
The communication network test device according to Supplementary note 51, said at least one message comprises a downlink information transfer message.

(Supplementary note 53)
A communication device for communicating with a communication network test device operable to monitor operation of said communication device, the communication device comprising a processor operable to:
operate a plurality of communication bearers associated with said communication device;
determine a subset comprising at least one communication bearer, selected from said plurality of communication bearers, to be used when performing a test and not comprising at least one other communication bearer of said plurality of communication bearers; and
communicate with the communication network test device in pursuance of a test in which each communication bearer in said subset is used and each communication bearer not in said subset is not used.

(Supplementary note 54)
A communication network test device for monitoring operation of a communication device, the test device comprising a processor operable to:
communicate with said communication device;
identify each of a plurality of communication bearers associated with said communication device;
determine a subset comprising at least one communication bearer, selected from said plurality of communication bearers, to be used when performing a test and not comprising at least one other communication bearer of said plurality of communication bearers; and initiate a test in which each communication bearer in said subset is used and each communication bearer not in said subset is not used.

(Supplementary note 55)
A communication system comprising the communication device of any of Supplementary notes 1 to 26, and 53, and the communication network test device of any of Supplementary notes 27 to 52, and 54.

(Supplementary note 56)
A method performed by a communication device for communicating with a communication network test device operable to monitor operation of said communication device, the method comprising:
establishing a plurality of communication bearers associated with said communication device;
determining a subset comprising at least one communication bearer, selected from said plurality of communication bearers, to be used when performing a test and not comprising at least one other communication bearer of said plurality of communication bearers; and
communicating with the communication network test device in pursuance of a test in which each communication bearer in said subset is used and each communication bearer not in said subset is not used.

(Supplementary note 57)
A method performed by a communication network test device for monitoring operation of a communication device, the method comprising:

establishing communication with said communication device;

identifying each of a plurality of communication bearers associated with said communication device;

determining a subset comprising at least one communication bearer, selected from said plurality of communication bearers, to be used when performing a test and not comprising at least one other communication bearer of said plurality of communication bearers; and initiating a test in which each communication bearer in said subset is used and each communication bearer not in said subset is not used.

(Supplementary note 58)

A non-transitory computer-readable medium storing a control program for causing a computer to perform a process of controlling the communication device of any of Supplementary notes 1 to 26, or 53, or the communication network test device of any of Supplementary notes 27 to 52, or 54.

This application is based upon and claims the benefit of priority from United Kingdom patent application No. 1305821.9 filed on 28 Mar. 2013, the disclosure of which is incorporated herein in its entirety by reference.

REFERENCE SIGNS LIST 1 communication system
3, 3-1, 3-2, 3-3 mobile communication device
5, 5-1, 5-2 E-UTRAN base station (eNB)
7 core network
8 serving GW (S-GW)
9 mobility management entity (MME)
10 PDN GW (P-GW)
11 system simulator (SS) entity
12 endpoint
51 transceiver circuit
53 antenna
55 user interface
57 controller
59 memory
61 operating system
63 communications control module
65 radio resource control (RRC) module
66 simulation module
67 loopback module
71 transceiver circuit
73 antenna
75 user interface
77 controller
79 memory
81 operating system
83 communications control module
85 direct communication module
87 radio resource control (RRC) module
89 loopback module

The invention claimed is:

1. A communication device for communicating with user equipment configured as a communication network test device operable to monitor operation of said communication device, the communication device comprising:
a controller configured to:
operate a plurality of communication bearers associated with said communication device;
determine a subset comprising at least one communication bearer, selected from said plurality of communication bearers, to be used when performing a test and not comprising at least one other communication bearer of said plurality of communication bearers; and
a transceiver configured to communicate with the communication network test device in pursuance of a test in which each communication bearer in said subset is used and each communication bearer not in said subset is not used.

2. The communication device according to claim 1, wherein said transceiver is operable to receive a message, from said communication network test device, the message comprising data identifying each communication bearer not in said subset, and
wherein said controller is operable to determine said subset based on said data identifying each communication bearer not in said subset.

3. The communication device according to claim 1, wherein said transceiver is further configured to receive a message, from said communication network test device, the message comprising data identifying each communication bearer in said subset, and
wherein said controller is operable to determine said subset based on said data identifying each communication bearer in said subset.

4. The communication device according to claim 3, wherein said message comprises a bit pattern with at least one respective bit associated with each communication bearer of said plurality of communication bearers associated with said communication device.

5. The communication device according to claim 4, wherein each said bit is set to a predetermine value if said communication bearer is in said subset.

6. The communication device according to claim 3, wherein said message comprises a bit pattern with at least one respective bit associated with a default communication bearer of said plurality of communication bearers associated with said communication device.

7. The communication device according to claim 6, wherein each said bit is set to a predetermine value if said default communication bearer and any associated communication bearer is in said subset.

8. The communication device according to claim 3, wherein said message comprises a bearer identifier (e.g. an Evolved Packet System, EPS, Bearer ID or EBI) for each communication bearer of said subset.

9. The communication device according to claim 3, wherein said message comprises a Non-Access Stratum, NAS, message.

10. The communication device according to claim 9 wherein said NAS message is embedded in at least one Radio Resource Control, RRC, message.

11. The communication device according to claim 10, wherein said at least one message comprises a downlink information transfer message.

12. The communication device according to claim 1, wherein said test is a loop-back test.

13. A communication system comprising the communication device of claim 1, and the communication network test device.

14. A non-transitory computer-readable medium storing a control program for causing a computer to perform a process of controlling the communication device of claim 1.

15. A method performed by a communication device for communicating with user equipment configured as a communication network test device operable to monitor operation of said communication device, the method comprising:

establishing a plurality of communication bearers associated with said communication device;

determining a subset comprising at least one communication bearer, selected from said plurality of communication bearers, to be used when performing a test and not comprising at least one other communication bearer of said plurality of communication bearers; and communicating with the communication network test device in pursuance of a test in which each communication bearer in said subset is used and each communication bearer not in said subset is not used.

16. A method performed by user equipment configured as a communication network test device for monitoring operation of a communication device, the method comprising:

establishing communication with said communication device;

identifying each of a plurality of communication bearers associated with said communication device;

determining a subset comprising at least one communication bearer, selected from said plurality of communication bearers, to be used when performing a test and not comprising at least one other communication bearer of said plurality of communication bearers; and initiating a test in which each communication bearer in said subset is used and each communication bearer not in said subset is not used.

* * * * *